United States Patent [19]

Gang, Jr.

[11] Patent Number: 5,696,763
[45] Date of Patent: Dec. 9, 1997

[54] MULTICAST ROUTING TECHNIQUE

[75] Inventor: Joseph Mark Gang, Jr., Saratoga, Calif.

[73] Assignee: Starlight Networks, Mountain View, Calif.

[21] Appl. No.: 417,067

[22] Filed: Apr. 4, 1995

[51] Int. Cl.[6] .................................................. H04L 9/00
[52] U.S. Cl. ..................... 370/390; 370/410; 370/401; 370/432; 370/910; 370/911; 348/16
[58] Field of Search .................. 370/60, 60.1, 61, 370/67, 118, 84, 85.1, 85.2, 85.3, 85.5, 85.7, 85.8, 85.9, 85.13, 85.11–85.12, 85.14, 85.15, 94.1, 94.2, 94.3, 95.1, 95.2, 389, 390, 360, 362, 363, 400–404, 410, 431, 432, 486, 487, 492, 463, 489, 490, 501, 502, 910, 911; 340/825, 825.01, 825.02, 825.03, 825.08, 825.05, 825.06, 825.07, 825.54; 348/16, 17, 423, 467, 6, 7, 12, 13; 455/4.1, 5.1

[56] References Cited

U.S. PATENT DOCUMENTS

| | | | |
|---|---|---|---|
| 4,701,906 | 10/1987 | Ransom et al. | 370/60 |
| 5,036,518 | 7/1991 | Tseung | 370/94.3 |
| 5,103,444 | 4/1992 | Leung et al. | 370/60 |
| 5,239,673 | 8/1993 | Natarajan | 370/85.5 |
| 5,276,681 | 1/1994 | Tobagi et al. | 370/94.1 |
| 5,327,426 | 7/1994 | Dolin, Jr. et al. | 370/85.13 |
| 5,371,532 | 12/1994 | Gelman et al. | 348/7 |
| 5,418,937 | 5/1995 | Inoue | 395/575 |
| 5,539,737 | 7/1996 | Leo et al. | 370/401 |

OTHER PUBLICATIONS

Stephen E. Deering, "Multicast Routing in Internetworks and Extended LANs", 1988 ACM 0-89791-279-9/88/008/0055.

*Primary Examiner*—Alpus H. Hsu
*Assistant Examiner*—Seema S. Rao
*Attorney, Agent, or Firm*—Meltzer, Lippe, Goldstein, Wolf, & Schlissel, P.C.

[57] ABSTRACT

Multicast video services are provided in a network having a star topology. The network illustratively compromises a switched hub having a shared transmission medium and a plurality of ports. An Ethernet segment is connected to each port. Client stations belonging to the Ethernet segments communicate to the associated ports information identifying the particular multicasts they wish to receive. This is accomplished by sending special packets (mask update packets) from the client stations to the ports. Only multicast video data packets belonging to multicasts identified in the update packets are transmitted by the ports on the associated Ethernet segments.

10 Claims, 2 Drawing Sheets

MULTICAST ROUTING TECHNIQUE

FIELD OF THE INVENTION

The present invention relates to a method for providing multicast services such as multicast video services in a network such as a local area network having a star topology.

BACKGROUND OF THE INVENTION

A local area network having a star topology is illustrated in FIG. 1. The network 10 of FIG. 1 comprises a switched hub 12. The switched hub 12 comprises a shared transmission medium 14 and a plurality of ports 16A, 16B, 16C, 16D, 16E. Each of the ports 16A, 16B, 16C, 16D, 16E is connected to a network segment 17A, 17B, 17C, 17D, 17E, respectively. Illustratively, the network segments 17 are Ethernet segments. In this case, each of the segments 17 is a single Ethernet collision domain. Each of the segments 17 contains one or more stations. Some of the segments such as segments 17A and 17B include only a single client station. The segment 17A comprises a client station 18A connected to the port 16A by the Ethernet channel 20A. The segment 17B comprises a client station 18B connected to the port 16B via the Ethernet channel 20B. Some other segments such as 17C and 17D include a plurality of client stations. The segment 17C includes two stations, 18C1 and 18C2, which are connected to the port 16C via the Ethernet channel 20C. The segment 17D includes three client stations, 18D1, 18D2, and 18D3 which are connected to the port 16D via the Ethernet channel 20D.

The Ethernet segment 17E comprises the server station 18E which is connected to the port 16E via the Ethernet channel 20E.

Each port 16 includes a transmit buffer 22 and a receive buffer 24. The transmit buffer 22 of each port 16 receives packets from the stations in the corresponding segment 17 via the Ethernet channel 20 and transmits these packets into the shared transmission medium 14. The receive buffer 24 receives packets from the shared transmission medium 14 and transmits the packets via a corresponding Ethernet channel 20 to the one or more stations 18 in the corresponding segment 17.

Transmissions via an Ethernet channel 20 between a port 16 and a station 18 on the associated segment 17 takes place using the IEEE 802.3 protocol or other protocol which guarantees appropriate bandwidth to a video stream.

Within the switching hub 12, the transmit buffer 22 of each port 16 accesses the shared transmission medium 14 under the control of a token passing scheme, for example. In this scheme, a token is passed from port to port. A transmit buffer 22 of a particular port 16 broadcasts a packet to all other ports via the shared transmission medium only when it has the token.

Illustratively, the server 18E is a video server. Typically, this server feeds into the network a plurality of simultaneous video streams in order to respond to the requests of various client stations. It is important for a number of client stations to be able to view audio visual information from a server simultaneously. When used in a business environment, such a network shared video presentation system can allow corporate resources such as sales videos, employee information, and video based training to be available to all employees immediately from their desks.

The characteristics of video traffic differ from those of traditional data traffic to the point that bandwidth allocation schemes in local area networks designed primarily to support data applications are not appropriate to effectively support video services. With data applications, the data rate associated with a traffic source is highly variable; i.e. it exhibits a high peak to average ratio. Accordingly, in a local area network for supporting data applications, the bandwidth allocation to the various applications is based on statistical multiplexing. In contrast, the data rate associated with the transmission of a video stream is relatively constant. The precise data rate of a video stream depends on the particular coding scheme used and the desired picture quality.

Thus, the transmission of a video signal of a certain data rate requires the provision of a channel of that data rate on a continuous basis to achieve timely delivery of the data. To support the transmission of multiple simultaneous video streams in a local area network, the necessary bandwidth must be provided for each such stream on a continuous basis and the total bandwidth for all the streams should not exceed the maximum which can be provided in the local area network. Thus, in a local area network which supports multiple simultaneous video streams, the bandwidth allocation should in general be carefully managed.

Network architectures using switched hubs (see FIG. 1) normally optimize point-to-point links. In the case of video services, however, a video stream is often transmitted simultaneously to a plurality of stations. Thus, a new problem is presented.

To conserve bandwidth, a one-to-many service is implemented via multicast. (In a multicast, a particular data stream is sent to a selected subset of all users in the network. In a broadcast, a particular data stream is sent to all the users in a network). Illustratively, the streams flow from a server (e.g. the video server 18E of FIG. 1), which injects a video stream into the network to enable many viewers to watch the stream. In many cases, the server will be a lower end desk top machine, not an expensive high end machine, yet it still needs to be able to service large number of viewers. Thus, sending a directed video stream to large numbers of viewers is often impractical.

In a conventional network with a star topology and a switched hub, the carrying of multicast video services causes serious difficulties. The reason is that every segment will carry the multicast service, even if no viewers on that segment are actually watching the service. In many situations (such as when there is more than one source of video streams), this will generate an unnecessary and often unacceptable load on the network segments.

In view of the foregoing, it is an object of the present invention to provide a method for delivering multicast video services in a network with a star topology in which the packets of a particular multicast service are forwarded only to those network segments with active viewers.

It is a further object of the invention to provide a method for delivering such multicast services in which all multicast traffic flows into the hub from a server, but only the subset of that multicast traffic needed by the viewers on a particular segment is forwarded to that segment.

SUMMARY OF THE INVENTION

In accordance with a preferred embodiment of the present invention, multicast services are provided in a local area network with a star topology as follows. Each client station communicates information to the port on the switched hub to which it is attached to identify the particular video multicasts it wants to start or continue receiving. This is accomplished by sending from each client station to the port a special packet known as a mask update packet. The mask update packet informs the port to start or continue the flow of packets belonging to particular video multicasts onto the associated network segment.

Preferably, a mask update packet is transmitted from each client station to the associated port periodically, for example, every fifteen seconds. If, after a certain period of time (e.g. sixty seconds), a port has not seen a mask update packet indicating a particular video multicast, the port will stop forwarding packets belonging to that particular video multicast to its associated network segment.

Mask update packets are similar to video multicast packets. They use the same multicast company address, but are distinguished from the video multicast data packets by a bit in the multicast address, called the mask update bit. (It should be noted that Starlight Networks, Inc., the assignee hereof, has reserved through the IEEE a special company 802 MAC address known as the Starlight Video Multicast ID.)

As used herein, the term "channel" refers to a single multicast address that contains a coherent group of information such as a particular video stream. A single viewer (i.e. client station) may wish to receive multiple channels, or a particular segment may contain multiple viewers who are viewing different channels.

Each multicast packet (video data packet or mask update packet) includes a multicast channel address field. The address field includes one bit position for each multicast channel. Therefore, each multicast video data packet will have exactly one of these bits set denoting its channel. Each mask update packet will have one or more of these bits set denoting which channels a viewer wishes to receive.

In a preferred implementation, each hub port contains two registers called current mask and next mask. When the port receives a multicast video data packet from the shared transmission medium of the hub switch, the port will AND the current mask register with the multicast channel address field in packet. If the result is non-zero, the port will transmit the packet on the associated segment.

Whenever the port receives a mask update packet from a client station on the associated segment, the port will OR the multicast channel address field in the packet with the next mask register and current mask register. Periodically, every sixty seconds, the next mask register is loaded into the current mask register and the next mask register is cleared.

The implementation using the next mask and current mask registers achieves two goals. First, when an initial mask update packet is received, multicast packets for that channel will start flowing immediately. Second, after a predetermined time interval (e.g. sixty seconds), if a port has not received a mask update packet for a particular channel, packets for that channel will stop flowing.

DETAILED DESCRIPTION OF THE INVENTION

Figure 1:
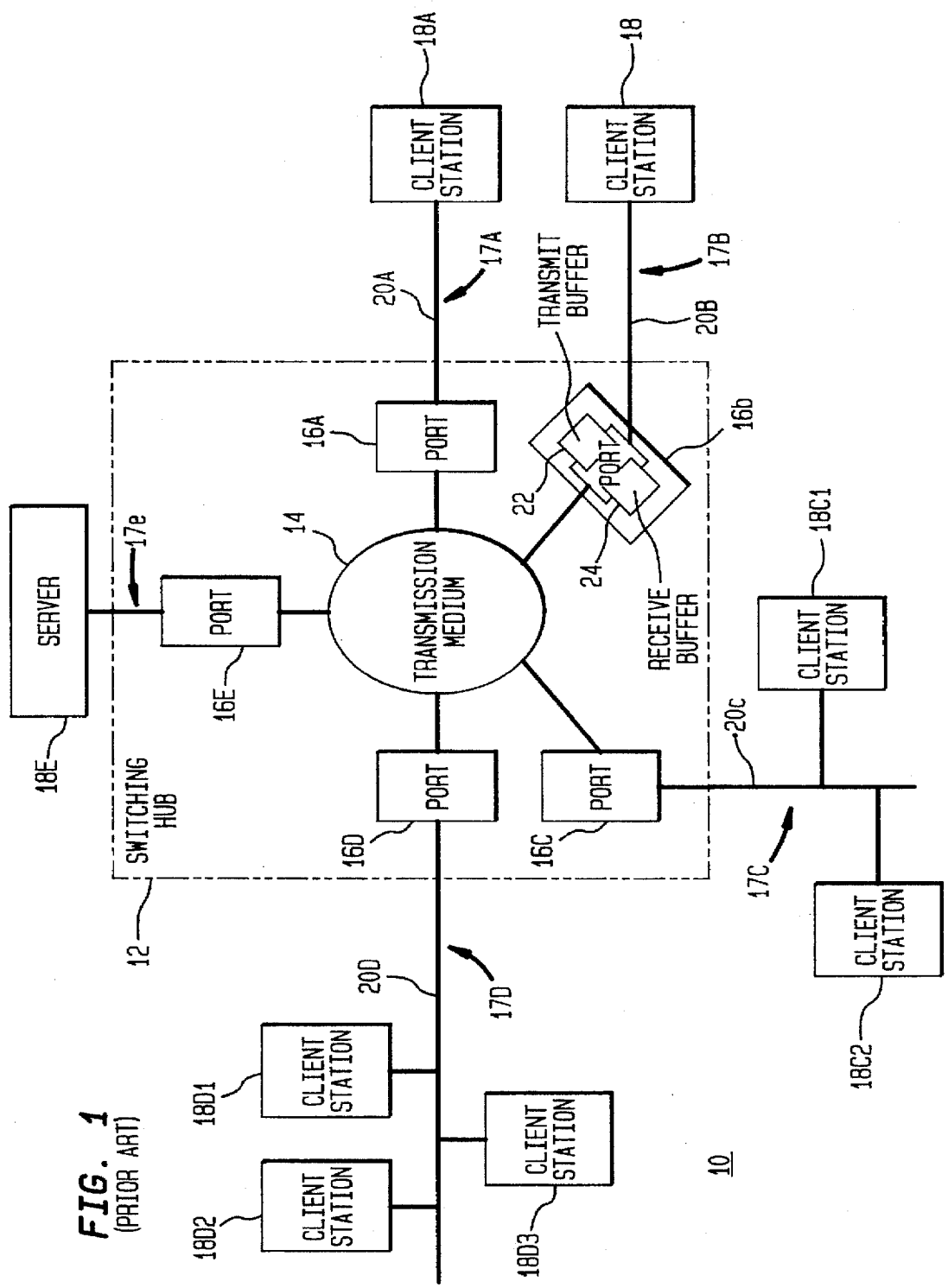
FIG. 1 schematically illustrates a local area network having a star topology.
Figure 2:
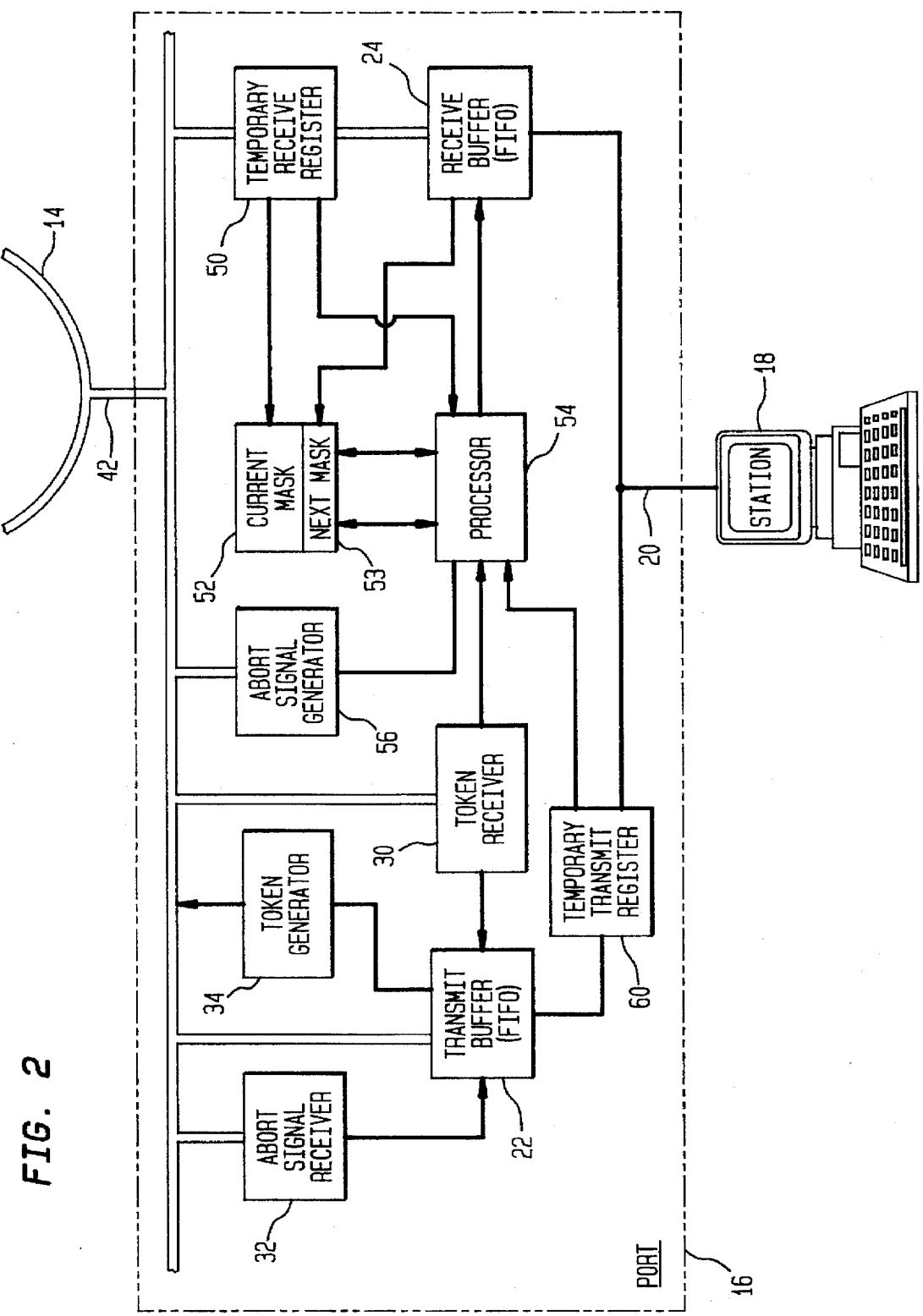
FIG. 2 illustrates a port for use in a local area network for carrying out the inventive technique for providing multicast services.

A port 16 which carries out the multicast routing process of the present invention is illustrated in greater detail in FIG. 2. An Ethernet channel 20 connects a station 18 to the port 16. The port 16 interfaces the station 18 to the shared transmission medium 14 of a switching hub (see FIG. 1) through use of the local bus As indicated above, the port 16 comprises a transmit buffer 22 of capacity Bt and a receive buffer 24 of capacity Br. The transmit buffer 22 sends packets from the station 18 out onto the shared transmission medium 14. The receive buffer 24 receives packets from the shared transmission medium 14 and transmits them via the channel 20 to the station 18.

As also indicated above, access of the transmit buffer 22 to the shared transmission medium 14 is illustratively controlled by a token passing scheme. In this scheme, a token is passed from port to port in a round robin fashion using a special channel of the shared transmission medium.

Thus, the port 16 of FIG. 2 includes a token receiver 30 which receives the token from the shared medium 14. When the port 16 of FIG. 2 receives the token at the token receiver 30, the transmit buffer 22 gains access to the shared medium 14.

When the transmit buffer 22 completes transmission of a packet via the shared transmission medium, or else receives at an abort signal receiver 32 a signal indicating that transmission of a packet should be aborted, the token is released. In this case, the token generator 34 regenerates the token for transmission via a special channel in the shared transmission medium 14 to the next port. The abort (or busy) signal is also transmitted via a special channel in the transmission medium 14.

The port 16 also includes circuit elements which enable the port 16 to determine whether or not to accept into the transmit buffer a particular packet received from the station 18. This circuitry includes the temporary transmit register 60 and the processor 54. When a packet arrives at the temporary transmit register 60 from the station 18, the processor 54 determines if the packet is a data packet that needs to be transmitted via the transmission medium 14, in which case the packet is written into the transmit buffer 22, or if the packet is some other kind of packet. For example, if the packet is a mask update packet, as indicated by the MAC address and mask update bit, the multicast channel address field of the mask update packet is ORed with the contents of the current mask register 52 and next mask register 53 to update the contents of these mask registers. Then, the mask update packet is deleted from the temporary transmit register.

The port 16 also includes circuit elements to determine whether or not to accept into the receive buffer 24 a packet transmitted via the shared medium 14 and local bus 42 from another port. The circuit elements for making this accept/reject determination include the temporary receive register 50, the current mask register 52, and the processor 54.

The temporary receive register 50 stores at least a header including a destination address of a packet broadcast via the shared transmission medium 14 and local bus 42. In the case where the currently received packet is a multicast video data packet as indicated by the MAC address and mask update bit (which is not set), the processor 54 ANDs the multicast channel address field of the currently received packet with the contents of the current mask. If the result is non-zero, control signals are sent from the processor 54 to the temporary receive buffer 50 and receive buffer 24 which enable the currently arriving packet to be written into the receive buffer 24. Otherwise the packet is deleted from the temporary receive buffer 50.

It should be noted that the port shown in FIG. 2 is illustrative only. The inventive multicast routing scheme may be used with other switching hubs wherein a switching fabric is used instead of a shared transmission medium and which incorporate other kinds of ports which do not use the token passing scheme.

The structure of the addresses in the multicast video packets (mask update and data) is now considered. Each such multicast packet includes a MAC address (such as the Starlight video multicast ID), which indicates that the packet is a multicast video packet. A mask update bit indicates whether the packet is a mask update packet or a multicast video data packet.

If the mask update bit is set, then the packets sole purpose in life is to update the port's mask. The rest of the packet is not critical, but it is advised that the following convention is used: set the source address to the source address of the sending Ethernet station, the Ethernet length field to the minimum length size, and pad the rest of the packet with 0's. This packet format will ensure compatibility with hubs that don't implement the multicast routing feature.

The destination address is a combination of Starlight's special Video Multicast ID, a mask update bit, and the mask (i.e. multicast channel address field containing one bit position for each multicast channel). In a mask update packet, the mask has a group of set bit positions corresponding to the group of multicasts a client station wishes to receive. In a data packet, the mask should contain exactly one bit set to logic "1" corresponding to the channel of the particular packet (Note—all 0's is not allowed!) and the rest of the bits set to logic "0". The address has the following format: (Bit number ordering is the order seen on the wire: 0 is the first bit seen.)

| Bit Number | Value | Meaning |
| --- | --- | --- |
| 0 | 1 | Multicast |
| 1–23 | 0x00 40 73C | Company MAC address, allocated to Starlight Networks, Inc. |
| 24–25 | 00 | Reserved |
| 26–30 | 00000 | Reserved, set to 0 |
| 31 | 0-data packet 1-mask update packet | Update Mask |
| 32–47 | m | Lower 16 bits of mask register indicating multicast channel number |

EXAMPLE

The following example uses standard notation for Ethernet addresses.

A feeder (e.g. a server such as the server 18E of FIG. 1) is allocated channel 1 for a video multicast service. It proceeds to send its service on address 01:40:73:00:00:01. Another feeder is allocated channel 3 for a video multicast service and sends on address 01:40:73:00:00:04. A client station "A" wishes to display channel 1. The client station "A" sends to its port a mask update packet with the bit position in the multicast channel address field corresponding to the destination address 01:40:73:10:00:01 being set, source address as its Ethernet address, length set to the minimum length, and the rest of the packet as 0. This updates the mask in the current mask register and next mask register in the port, and the port routes packets with a destination of 01:40:73:00:00:01 down that segment. The client station "A" continues to send mask update packets as long as it wishes to receive that channel. Another client station "B" on the same Ethernet segment wants to receive Channel 3. The client station "B" sends mask update packets with the bit position in the multicast channel address field corresponding to destination address 01:40:73:10:00:04 being set. The port updates its mask by ORing this mask together with its internal mask in the current mask and next mask registers, and forwards all packets of either address. Should client station "B" terminate, the port will stop receiving mask update packets for channel 3 and will stop forwarding this channel, however, it will continue to forward packets for channel 1 as long as it continues to receive mask updates for channel 1 from client station "A". Later client station "A" decides to receive channels 1 and 3. It could either send two mask update packets one for each channel, or send one packet—01:40:73:10:00:65, which is the OR of the two mask values.

In short, there has been disclosed a method for providing multicast services such as multicast video services in a network such as a local area network having a star topology. Finally, the above-described embodiments of the invention are intended to be illustrative only. Numerous alternative embodiments may be devised by those skilled in the art without departing from the scope of the following claims.

I claim:

1. A process for transmitting multicast packets comprising:

transmitting an update packet periodically from a station via a network segment to a port of a switching hub, which update packet contains information for updating a mask associated with said port which connects said station to said switching hub;

updating said mask in accordance with said mask update information at said port of said switching hub;

masking multicast channel information in each multicast packet received at said switching hub with said updated mask; and transmitting particular ones of said multicast packets from said switching hub via said port connecting said station if said updated mask indicates that said multicast packets belong to a multicast channel which said station wishes to begin or continue receiving.

2. A process for controlling the transmission of multicast packets from a port that connects a station to a switching hub comprising the steps of:

transmitting an update packet from said station to said port of said switching hub, which update packet contains mask update information;

updating a mask in accordance with said mask update information at said port of said switching hub; and transmitting via said port multicast packets which contain multicast channel information if said updated mask indicates that said station wishes to begin or continue receiving said multicast channel information contained in said multicast packets.

3. A process for transmitting multicast packets from a switching hub via one or more of a plurality of ports which ports each connect one or more stations to said switching hub, said process comprising the steps of:

receiving a mask at each of said plurality of ports from said one or more stations connected thereto;

masking multicast channel information in each of said multicast packets with said mask; and transmitting each of said multicast packets from said switching hub via particular port if said mask received from said one or more stations connected thereto indicates that said multicast packets belong to a multicast channel which one of said stations connected to said particular port wishes to begin or continue receiving.

4. The process of claim 3 further comprising the steps of:

transmitting an update packet periodically from one of said stations to one of said ports connected thereto, which update packet indicates particular multicast channels that one of said stations wishes to start or continue receiving; and updating said mask corresponding to said one port in accordance with said particular multicast channels indicated by said update packet.

5. The process of claim 4, said process farther comprising the step of:

stopping the transmission from said one port of multicast packets belonging to a specific multicast channel if, after a predetermined time period, said one port fails to receive an update packet from any of said stations connected thereto indicating said specific multicast channel.

6. The process of claim 4 wherein said update packet has one bit position corresponding to each individual multicast channel, said process further comprising the step of:

setting the bit position in said update packet transmitted in said step of transmitting an update packet corresponding to the particular multicast channels said station wishes to start or continue receiving.

7. The process of claim 4 wherein said multicast packet has one bit position corresponding to each individual multicast channel and wherein one bit position in each of said multicast packets is set to denote a particular multicast channel to which the multicast packet belongs.

8. The process of claim 3 wherein said stations are connected to said ports of said switching hub via a transmission medium to form a local area network.

9. The process of claim 3 wherein each port is connected to one or more stations via a transmission medium to form an Ethernet segment.

10. The process of claim 3 wherein said multicast packets contain video data.

* * * * *